US012623229B2

(12) United States Patent
Delahunty et al.

(10) Patent No.: US 12,623,229 B2
(45) Date of Patent: May 12, 2026

(54) MAGNETIC STORAGE DECLASSIFICATION DEVICE

(71) Applicant: IRON MOUNTAIN INCORPORATED, Portsmouth, NH (US)

(72) Inventors: Thomas Delahunty, Milford, MA (US); Eugene McCabe, Milford, MA (US)

(73) Assignee: Iron Mountain Incorporated, Boston, MA (US)

( * ) Notice: Subject to any disclaimer, the term of this patent is extended or adjusted under 35 U.S.C. 154(b) by 742 days.

(21) Appl. No.: 17/963,493

(22) Filed: Oct. 11, 2022

(65) Prior Publication Data

US 2023/0111358 A1 Apr. 13, 2023

Related U.S. Application Data

(60) Provisional application No. 63/254,677, filed on Oct. 12, 2021.

(51) Int. Cl.
*B02C 18/00* (2006.01)
*G11B 5/024* (2006.01)

(52) U.S. Cl.
CPC ............ *B02C 18/00* (2013.01); *G11B 5/0245* (2013.01)

(58) Field of Classification Search
CPC ............................... B02C 18/00; G11B 5/0245
See application file for complete search history.

(56) References Cited

U.S. PATENT DOCUMENTS

| | | | | |
|---|---|---|---|---|
| 8,887,605 B2* | 11/2014 | van Gemert | ........ | B02C 18/2233 |
| | | | | 83/385 |
| 9,947,343 B1* | 4/2018 | Crook | ................... | G11B 5/0245 |
| 10,071,382 B1* | 9/2018 | Ebadian | .................. | B02C 18/22 |
| 10,556,240 B2 | 2/2020 | Clark | | |
| 10,657,345 B1* | 5/2020 | Ebadian | .................. | B02C 25/00 |
| 10,675,635 B1* | 6/2020 | Drexler | ................... | B02C 25/00 |

(Continued)

FOREIGN PATENT DOCUMENTS

| | | |
|---|---|---|
| CN | 211964462 U | 11/2020 |
| CN | 112076864 A | 12/2020 |

(Continued)

OTHER PUBLICATIONS

Translation of DE-102016000323-A1 (Year: 2017).*
Translation of DE-202009012352-U1 (Year: 2011).*
Translation of WO-2019075530-A1 (Year: 2019).*

*Primary Examiner* — Jeffrey T Carley
(74) *Attorney, Agent, or Firm* — Kilpatrick Townsend & Stockton LLP

(57) ABSTRACT

A media declassification device receives a media component such as a magnetic hard disk drive, and deletes data stored thereon by physical agitation and dismantling the media component. A cutting blade shears or grinds a perimeter region around a top of the hard disk drive (HDD drive, or simply drive) to a predetermined depth calculated to remove heads from screws and other fasteners securing a metal top panel. Inversion of the drive allows a magnetic media platter upon which data is stored to simply drop out. The magnetic platter is fed into a shredding device for obliteration to sufficiently small particles for declassification, while rare earth magnets are removed from the remaining drive chassis, and the now declassified chassis discarded into a recycling stream.

11 Claims, 5 Drawing Sheets

(56) References Cited

U.S. PATENT DOCUMENTS

| | | | | |
|---|---|---|---|---|
| 11,389,805 | B1 * | 7/2022 | Ebadian | B02C 19/0056 |
| 12,280,457 | B2 * | 4/2025 | Clark | B03B 9/061 |
| 2011/0090585 | A1 * | 4/2011 | Schwarcz | G11B 5/0245 |
| | | | | 206/223 |
| 2012/0091237 | A1 * | 4/2012 | Clark | G11B 5/0245 |
| | | | | 241/23 |
| 2014/0263216 | A1 * | 9/2014 | Clark | G11B 23/505 |
| | | | | 241/47 |
| 2015/0294786 | A1 * | 10/2015 | Zakotnik | C22C 38/005 |
| | | | | 419/33 |
| 2016/0313099 | A1 * | 10/2016 | Daniels | F42B 12/44 |
| 2020/0270725 | A1 * | 8/2020 | McIntyre | H01F 7/02 |
| 2020/0363790 | A1 * | 11/2020 | Harper | G05B 19/41865 |
| 2021/0213573 | A1 * | 7/2021 | Clark | C22B 1/005 |

FOREIGN PATENT DOCUMENTS

| | | | | | |
|---|---|---|---|---|---|
| DE | 202009012352 | U1 * | 2/2011 | | B02C 18/182 |
| DE | 102016000323 | A1 * | 1/2017 | | B02C 18/2291 |
| WO | WO-2019075530 | A1 * | 4/2019 | | B02C 19/0056 |

* cited by examiner

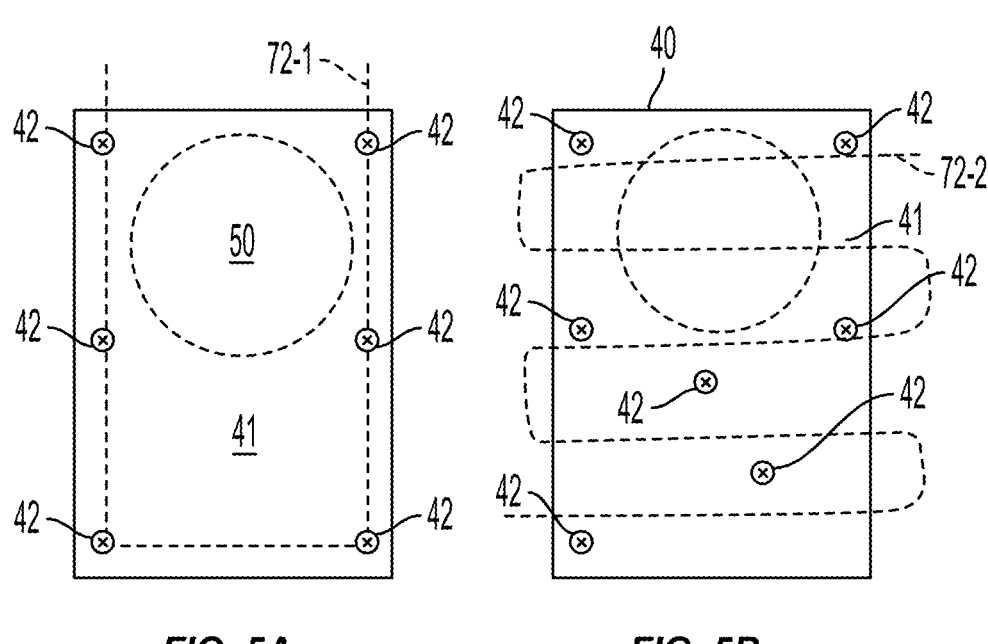
FIG. 5A                    FIG. 5B
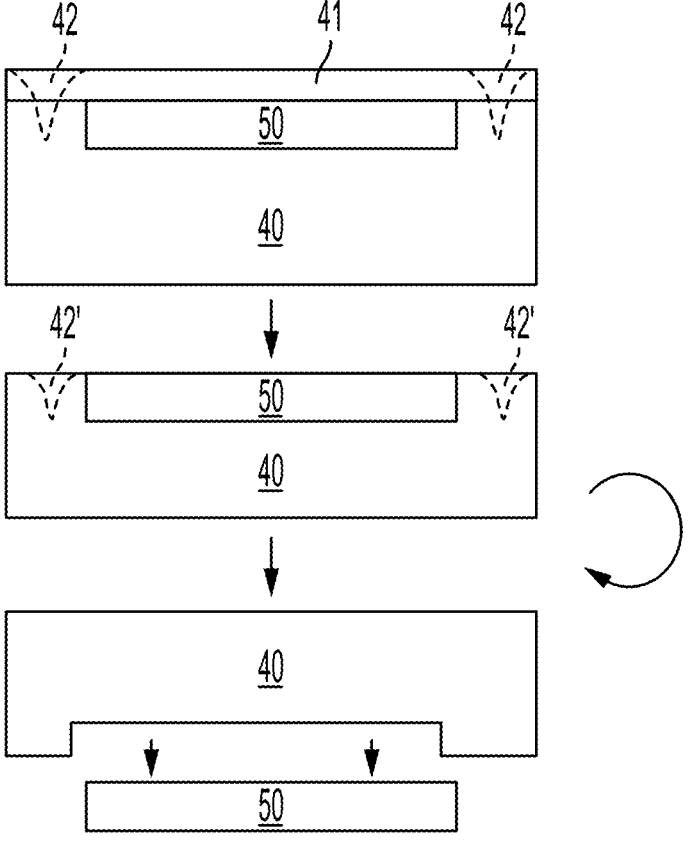
FIG. 6

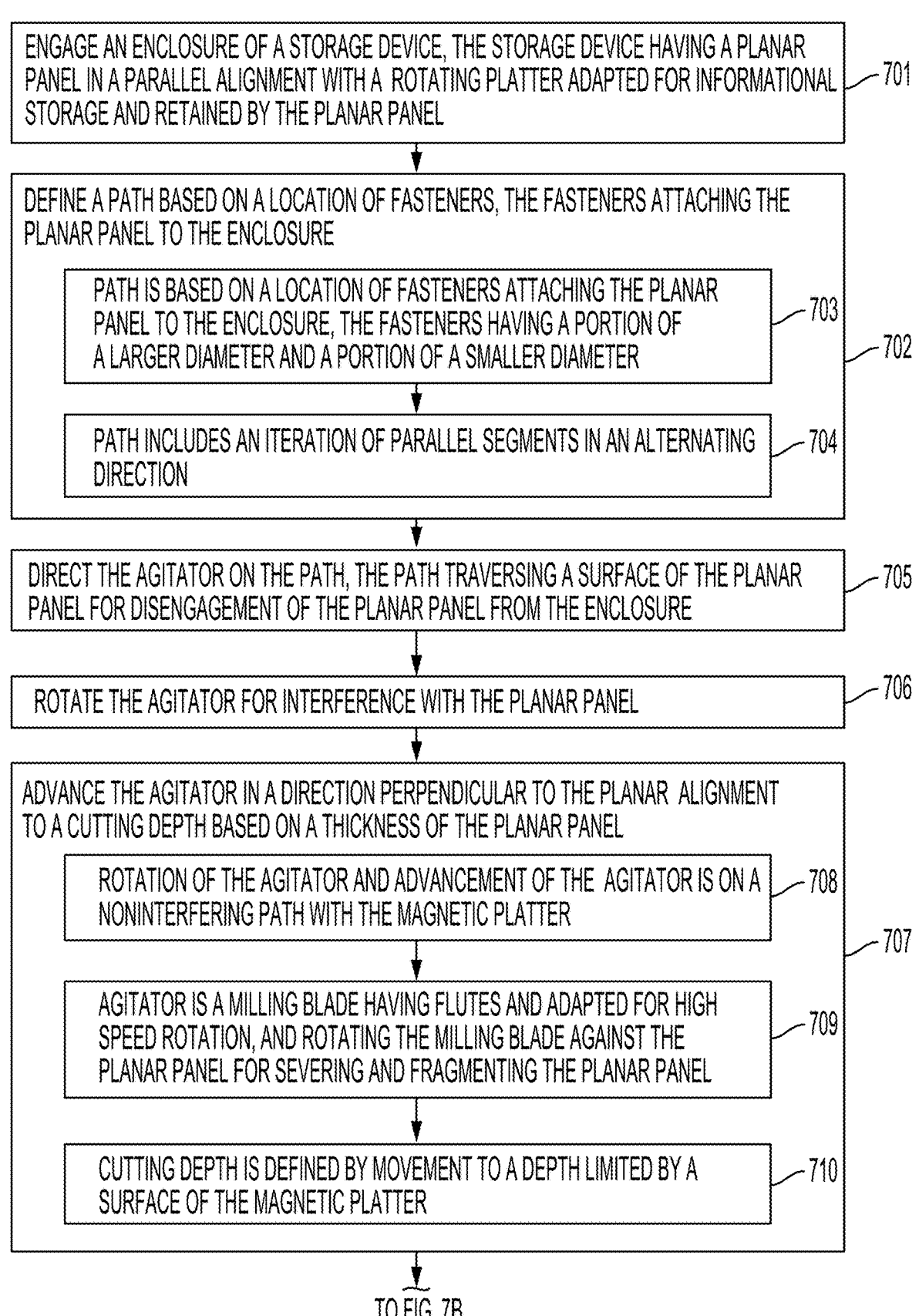

ENGAGE AN ENCLOSURE OF A STORAGE DEVICE, THE STORAGE DEVICE HAVING A PLANAR PANEL IN A PARALLEL ALIGNMENT WITH A ROTATING PLATTER ADAPTED FOR INFORMATIONAL STORAGE AND RETAINED BY THE PLANAR PANEL — 701

DEFINE A PATH BASED ON A LOCATION OF FASTENERS, THE FASTENERS ATTACHING THE PLANAR PANEL TO THE ENCLOSURE — 702

PATH IS BASED ON A LOCATION OF FASTENERS ATTACHING THE PLANAR PANEL TO THE ENCLOSURE, THE FASTENERS HAVING A PORTION OF A LARGER DIAMETER AND A PORTION OF A SMALLER DIAMETER — 703

PATH INCLUDES AN ITERATION OF PARALLEL SEGMENTS IN AN ALTERNATING DIRECTION — 704

DIRECT THE AGITATOR ON THE PATH, THE PATH TRAVERSING A SURFACE OF THE PLANAR PANEL FOR DISENGAGEMENT OF THE PLANAR PANEL FROM THE ENCLOSURE — 705

ROTATE THE AGITATOR FOR INTERFERENCE WITH THE PLANAR PANEL — 706

ADVANCE THE AGITATOR IN A DIRECTION PERPENDICULAR TO THE PLANAR ALIGNMENT TO A CUTTING DEPTH BASED ON A THICKNESS OF THE PLANAR PANEL — 707

ROTATION OF THE AGITATOR AND ADVANCEMENT OF THE AGITATOR IS ON A NONINTERFERING PATH WITH THE MAGNETIC PLATTER — 708

AGITATOR IS A MILLING BLADE HAVING FLUTES AND ADAPTED FOR HIGH SPEED ROTATION, AND ROTATING THE MILLING BLADE AGAINST THE PLANAR PANEL FOR SEVERING AND FRAGMENTING THE PLANAR PANEL — 709

CUTTING DEPTH IS DEFINED BY MOVEMENT TO A DEPTH LIMITED BY A SURFACE OF THE MAGNETIC PLATTER — 710

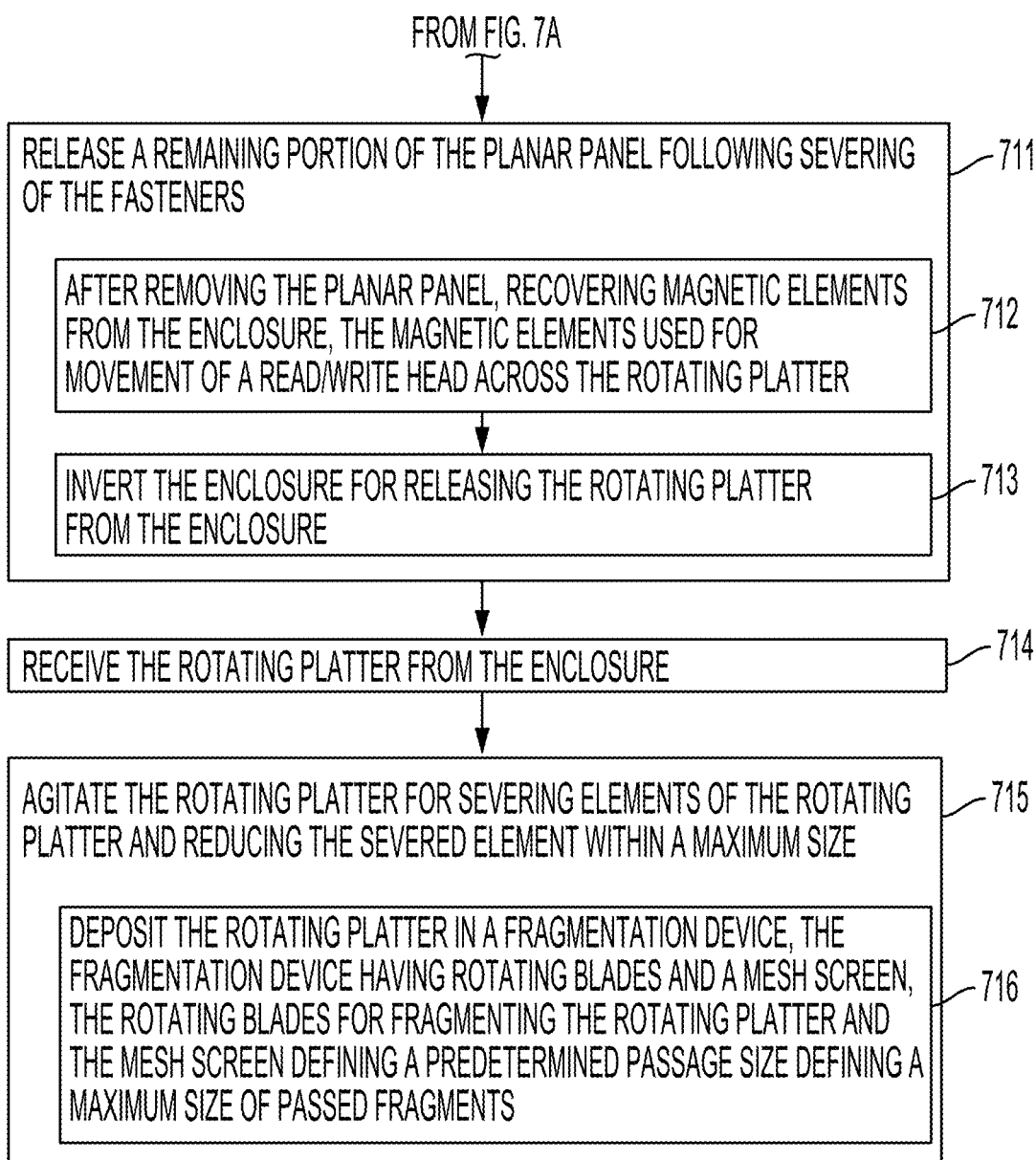

FROM FIG. 7A

RELEASE A REMAINING PORTION OF THE PLANAR PANEL FOLLOWING SEVERING OF THE FASTENERS — 711

AFTER REMOVING THE PLANAR PANEL, RECOVERING MAGNETIC ELEMENTS FROM THE ENCLOSURE, THE MAGNETIC ELEMENTS USED FOR MOVEMENT OF A READ/WRITE HEAD ACROSS THE ROTATING PLATTER — 712

INVERT THE ENCLOSURE FOR RELEASING THE ROTATING PLATTER FROM THE ENCLOSURE — 713

RECEIVE THE ROTATING PLATTER FROM THE ENCLOSURE — 714

AGITATE THE ROTATING PLATTER FOR SEVERING ELEMENTS OF THE ROTATING PLATTER AND REDUCING THE SEVERED ELEMENT WITHIN A MAXIMUM SIZE — 715

DEPOSIT THE ROTATING PLATTER IN A FRAGMENTATION DEVICE, THE FRAGMENTATION DEVICE HAVING ROTATING BLADES AND A MESH SCREEN, THE ROTATING BLADES FOR FRAGMENTING THE ROTATING PLATTER AND THE MESH SCREEN DEFINING A PREDETERMINED PASSAGE SIZE DEFINING A MAXIMUM SIZE OF PASSED FRAGMENTS — 716

*FIG. 7B*

MAGNETIC STORAGE DECLASSIFICATION DEVICE

RELATED APPLICATIONS

This patent application claims the benefit under 35 U.S.C. § 119 (e) of U.S. Provisional Patent App. No. 63/254,677, filed Oct. 12, 2021, entitled "MAGNETIC STORAGE DECLASSIFICATION DEVICE" incorporated herein by reference in entirety.

BACKGROUND

Modern electronic proliferation of information has led to a tremendous quantity of data, sensitive and otherwise, being stored in electronic form, typically in non-volatile memory such as Hard Disk Drives (HDDs), SSDs Solid State Drives (SSDs) and other forms of electronic and magnetic media. Deletion of sensitive information from electronic sources can be elusive, however. Many deletion operations merely reflag or designate areas corresponding to deleted data as available for new data, without actually overwriting or modifying the deleted region. Direct access mechanisms, which access media on a location basis, rather than through a file system, can bypass the deletion flags and effectively access "deleted" data. Further, even when data is overwritten with new data, techniques exist to recover residual indications of previously stored data.

SUMMARY AND DISCLOSURE

A media declassification device receives a media component such as a magnetic hard disk drive, and deletes data stored thereon by physical agitation and dismantling the media component. A cutting blade shears or grinds a perimeter region around a top of the hard disk drive (HDD drive, or simply drive) to a predetermined depth calculated to remove heads from screws and other fasteners securing a metal top panel. Inversion of the drive allows a magnetic media platter upon which data is stored to simply drop out. The magnetic platter is fed into a shredding device for obliteration to sufficiently small particles for declassification, while rare earth magnets are removed from the remaining drive chassis, and the now declassified chassis discarded into a recycling stream.

Configurations herein are based, in part, on the observation that it can be problematic to ensure complete erasure of data from storage media once the media has been taken out of service. Data security techniques often impose requirements of overwriting and unreadability for decommissioned media; in the case of governmental regulations governing sensitive data, physical dismantling of media to a particle size deemed unreadable is required to render formerly classified data as "declassified."

Storage devices, however, typically include an enclosure around a chassis with electronics and mechanical elements for accessing the magnetic media platter on which information is actually encoded. HDDs, unlike their solid state counterparts, include substantial metal and mechanical components having a volume substantially greater than the media platter in need of declassification. It would be inefficient to require the entire volume of the drive apparatus to undergo the physical dismantling and/or shredding that need be applied only to the media platter on which the data is stored. Unfortunately, conventional approaches suffer from the shortcoming that it can be problematic to automate the drive disassembly to separate the platter because the drive is a metal enclosure with fasteners that vary in type, location and size among different vendors.

Accordingly, configurations herein substantially overcome the shortcomings of conventional disk drive declassification by identifying a fastener region on the disk drive and providing a milling head that shears and obliterates the fastener region to a depth sufficient to eradicate the fasteners and enclosure top that retain the platter. Once the screws are ground away, the remainder of the top enclosure panel, and the platter, are detached. Liberation of the enclosure surface adjacent the media platter allows the platter to simply release when the enclosure is inverted, and "fall out," either into a holding repository or directly into a shredding or declassification stream targeting only the media platter. In other words, only the platter, not the entire drive mechanism, is directed to the declassification shredder process.

In further detail, the device herein implements a system for declassification of sensitive media materials by dismantling storage media and rendering to an unreadable granular texture, including a robotic receptacle configured to receive a storage device having a rotating platter for magnetic encoding. The storage device typically has a planar panel in a parallel alignment with the rotating platter adapted for informational storage, and retained by the planar panel, often the top or bottom panel of the enclosure. A rotating agitator or milling blade has a plurality of cutting edges for dismantling and shearing the panel. Processor based control logic directs the agitator, such that the agitator is responsive to the control logic for disposing the enclosure in communication with the agitator to engage the panel for dismantling and liberating a magnetic platter from restraint by the enclosure. The control logic is configured to direct the agitator on a path traversing a surface of the planar panel for disengagement of the planar panel from the enclosure, thereby releasing the magnetic platter for grinding into unreadable fragments, typically with a maximum 2 mm size.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A and 5B show a diagram of a path of the agitator as in FIG. 4;

FIG. 6 shows a side cutaway view of the declassification process of FIGS. 1-5; and FIG. 7 shows a flowchart of the declassification process as performed by the device of FIGS. 1-4.

DETAILED DESCRIPTION

Depicted below are several examples of a media declassification device according to configurations herein. Physical dismantling of the media device is shown, including severing fragments of the existing storage media and portions of the accompanying enclosure.

The hard disk drive, or HDD, is an electro-mechanical data storage device that stores and retrieves digital data using magnetic storage and one or more rigid, rapidly rotating platters coated with magnetic material. The rotating platters encode data through magnetic impulses written by a read/write head such that the magnetic impulse is stored as a binary 1 or 0 for subsequent retrieval. Data storage based on magnetic impulses has been in widespread usage on computers for decades, and has taken the form of reel-to-reel tapes, floppy disks, and hard disks. Hard disks are particularly beneficial because they operate in a sealed, dust-proof enclosure that permits higher density of the magnetic pulses and thus, have greater storage capacity. The rotating platter is the derivation of the moniker "disk," and the "hard disk" qualifier distinguishes over flexible media such as floppy disks and magnetic tape, now deemed largely obsolete. The rotating magnetic platter, or simply rotating platter or magnetic platter, refers to this magnetic medium that is encoded with data, although common usage often refers to the entire enclosure, chassis and magnetic platter as a "hard drive," or HDD.

Industry conventions for HDDs have led to a 3.5 inch drive for desktop computers and a 2.5 inch drive for laptop computers as typical configurations. Further, the size of the corresponding enclosures is also generally standardized to allow interoperability between drive manufacturers and the computer cases that receive them. Nonetheless, disassembly and/or access to the platter is problematic to standardize because within the standard enclosure size, manufacturers place fasteners that secure the enclosure according to different patterns, based on manufacturer specific architecture of the read/write head and associated electronics. Nonetheless, the form factor of the typical enclosure only permits fastener installation in a certain fastener region around the top of the HDD enclosure, to avoid interference with the rotating platter and swing region of the read-write head. In other words, a fastener region can be construed around the perimeter of an HDD for a large percentage of drives because of design constraints of platter and moveable head placement limit the available locations for fastener placement.

Figure 1:
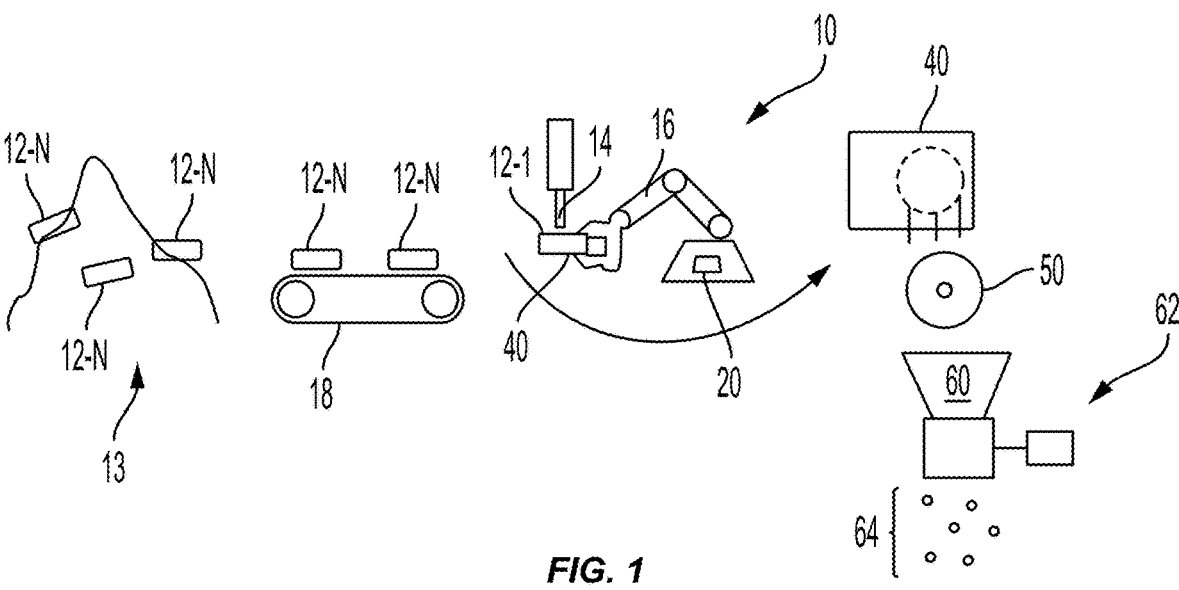
FIG. 1 shows a schematic workflow of the media declassification device as defined herein.

Accordingly, in a context diagram in FIG. 1, a media declassification device 10 for a hard disk drive (HDD) 12-1 . . . 12-N (12 generally) includes an agitator 14 having a plurality of cutting edges for dismantling rigid materials, and a guidance element such as a robotic arm 16 for directing the HDD against the agitator. Control logic 20, such as a computer program, directs the enclosure 40 such that the agitator evacuates a portion of the enclosure for disengaging the enclosure and liberating a magnetic platter 50 from restraint by the enclosure 40.

In FIG. 1, the guidance element includes a robotic member (arm) 16 configured to secure the enclosure 40 and dispose the enclosure for engagement with the agitator 14. The guidance element may also include a conveyor 18 for transporting the HDDs 12 to proximity of the robotic member, often from an inventory 13 of retired HDDs. The robotic member 16 moves the enclosure under the spinning agitator 14 for shearing fragments of the enclosure. The agitator 14 removes an upper portion of the enclosure to shear all attachment points (screws), such that by inverting the enclosure the now unrestrained platter 50 is free to separate and fall from gravitational force. The liberated platter would typically be fed to a hopper 60 or feed of a pulverizing and shredding device 62, such as that disclosed in U.S. patent application Ser. No. 17/704,391, filed Mar. 25, 2022, entitled "MEDIA DECLASSIFICATION DEVICE," incorporated herein by reference in entirety, for reducing the magnetic platter material to 2 mm size particles 64 or smaller, sufficient to be considered declassified and unreadable.

Figure 2:
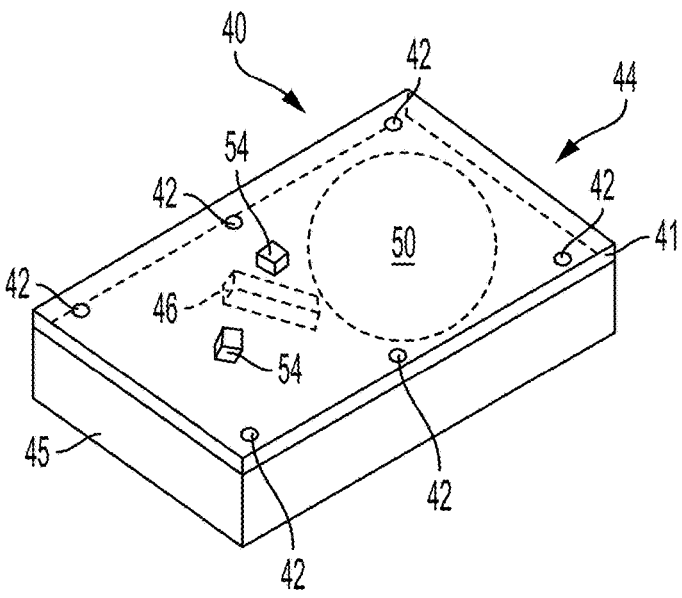
FIG. 2 shows a hidden view of the platter and read/write head for removal.
Figure 3:
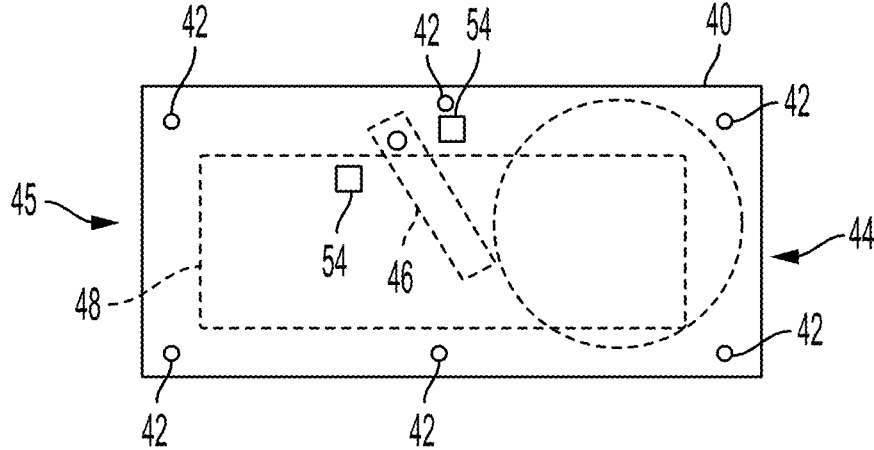
FIG. 3 shows a top hidden view of the enclosure and platter.

FIG. 2 shows a hidden view of the platter 50 and read/write head 46 concealed in the enclosure 40. Referring to FIG. 2, the enclosure 40 has the appearance of a metal case and is formed from metal (steel or aluminum) panels including a top 41 that fasten together and to an inner chassis by screws 42, rivets, and/or similar fasteners. Since HDDs are typically installed against a wall of the computer case, it can be inferred that that the platter 50 occupies a particular region adjacent a longitudinal end 44. The opposed side 45 therefore has the necessary clearance for power and I/O connectors. Such geometry causes the read/write head 46 to be just adjacent to the platter 50. FIG. 3 shows a top hidden view of the enclosure 40 and platter 50. The guidance element is responsive to the control logic for directing the agitator 14 for removal of at least a screw-restrained portion of the enclosure 40. The removed portion is defined by a fastener region 48 of the top 41 of the enclosure 40 and based on a fastener depth of the top of the enclosure. Based on the geometry necessitated by the HDD form factor and the need for connectors on a particular side 45, the fastener region 48 may be defined by areas based on the perimeter and outside of interference with the rotating platter 50, pivoting read/write head 46, and connectors. Of further note are rare-earth magnets 54, invoked for read/write head 46 movement, which may also be robotically removed for residual value.

Figure 4:
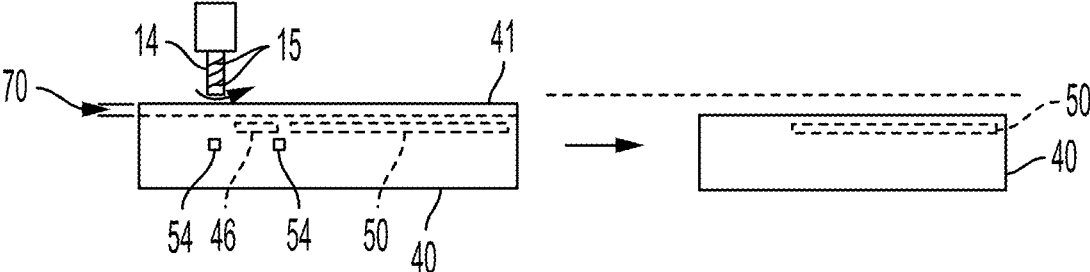
FIG. 4 shows a side view of the agitation and shearing process.

FIG. 4 shows a side view of the agitation and shearing process. The agitator 14 is a rotary member having edges 15 for shearing fragments of the enclosure 40 as it rotates. The control logic 20 is configured to identify the top 41 of the enclosure 40 as a planar panel longitudinally extending across the HDD and in a parallel adjacency with a plane in which the magnetic platter 50 rotates. The agitator 14 is a rotating blade configured for cutting to a limit defined by the plane based on a thickness of a top panel of the enclosure. The platter 50 resides close to but slightly below the top 41 of the enclosure. The agitator 14 makes transverse passes over the top at a fastener depth 70 just above the platter and the read/write head. The fastener depth is about 3-4 mm, and the agitator 14 extends to this depth to remove the fasteners and portion of the top 41 to release the platter 50. Alternatively, the agitator 14 could rotate on an axis parallel to the plane of the top 41, rather than perpendicular, depending on the blade edge 15 and traversal pattern.

A particular configuration includes a mechanical gate for selective determination of the HDD. The mechanical gate is responsive to selection logic in the guidance element for identifying and denoting the selected HDD as declassified. An optical recognition system identifies a marking or bar code on a particular drive from among a plurality of HDDs, and catalogs selection and processing for rendering the selected drive non-operational and declassified.

Particular configurations may include a heating element for removal of the rare-earth magnets that guide the read-write head. Magnetic members such as the rare-earth magnets exhibit strong magnetic fields needed for high-speed movement of the read-write head, hence the magnets have residual value. The magnets are adhesively secured within the enclosure, and heat degrades the adhesive for facilitating removal. Similar milled or heat based removal may also be employed for a printed circuit board (PCB) for HDD control; residual value may be found in gold used for PCB connectors. Upon completion of platter removal, the platter itself is agitated and destroyed by a shredding, grinding or declassification device.

FIGS. 5A and 5B show a diagram of a path of the agitator as in FIG. 4. Referring to FIGS. 5A and 5B, as previously explained, HDD vendors assemble the enclosure 40 and top planar panel 41 with screws 42 or other fasteners in various locations. The outer dimensions of the enclosure 40 however, generally follow an industry standard. A path 72-1 and 72-2 (72 generally) define travel of the agitator 14 for shearing the screws 42 and portions of the top 41 to release the platter 50. A perimeter path 72-1 takes a perimeter approach, for top panels 41 secured around the edges. An alternate path 72-2 traverses alternating paths of a width of the agitator to completely obliterate the top panel 41. Other suitable paths may be taken depending on the location of known screw 42/fastener locations. A cutting depth of the agitator extends to the thickness of a head of the screw 42 for shearing or grinding the screw head and any holding power securing the top 41 to the chassis.

FIG. 6 shows a side cutaway view of the declassification process of FIGS. 1-5. The system of FIG. 1 effectively separates the data-containing component defined by the rotating magnetic platter 50 from the remainder of the enclosure 40, top planar panel (top) 41 and chassis, which comprise the bulk of the waste mass. This effectively channels the security sensitive material—the platter 50—from the waste stream of HDD chassis. In FIG. 6, the incoming chassis 40, magnetic platter 50, and top 41 retaining the platter 50 in the chassis 40 with screws 42 is shown in a side cutaway view. Following removal of the top 41, the platter 50 remains uncovered, as the screws 42 have been sheared off at the heads leaving only the threaded, inserted portion 42'. Upon inversion, or alternatively, robotic removal, the platter 50 drops out via gravity leaving the unclassified chassis, now devoid of any sensitive storage medium, for waste.

FIG. 7 shows a flowchart of the declassification process as performed by the device of FIGS. 1-4. Referring to FIGS. 1-7, in a storage management environment having storage devices with a history of retaining classified information and a need for rendering the storage device unreadable at an end of service life, a method for declassifying a storage device includes engaging an enclosure 40 of a storage device. The storage device having a planar panel, generally the top panel 41 of the enclosure, in a parallel alignment with the rotating platter 50 adapted for informational storage and retained by the planar panel, depicted at step 701.

Control logic 20 defines a path 72 based on a location of fasteners such as screws 42, where the fasteners attach the planar panel to the enclosure, as shown at step 702. The path 72 is based on a location of the fasteners attaching the planar panel 41 to the enclosure 40, at step 703, such that the fasteners have a portion of a larger diameter and a portion of a smaller diameter, and the cutting depth is further based on a thickness of the larger diameter. The larger diameter portion is typically called the head of the screw 42 and forms an interference fit with a smaller aperture in the planar panel 41 through which the smaller diameter portion of the screw passes. In a comprehensive solution, the path 72-2 may simply include an iteration of parallel segments in an alternating direction, depicted at step 704, composed of paths slightly narrower than the width of the agitator for complete shearing of the top 41 and the screw heads.

The control logic 20 directs the agitator 14 on the path 72 traversing a surface of the planar panel 41 for disengagement of the planar panel from the enclosure 40, depicted at step 705. The agitator 14 rotates for interference with the planar panel for shearing the panel and any screws 42 securing the top panel, disclosed at step 706.

Before traversing the path, the control logic advances the agitator 14 in a direction perpendicular to the planar alignment to a cutting depth based on a thickness of the planar panel, depicted at step 707. In the approach of FIG. 1, the agitator 14 descends to a depth for breaching the top 41 and screws heads, however rotation of the agitator 14 and advancement of the agitator is on a noninterfering path with the magnetic platter 50, as depicted at step 708. The close tolerance provides that platter fragments, possibly containing sensitive information, will not be disrupted until the entire platter 50 is disposed in a secure manner.

The agitator 14 is typically a milling blade having flutes 15 and adapted for high speed rotation, such that rotation of the milling blade against the planar panel severs and fragments the planar panel 41, as shown at step 709. Other suitable agitators may be employed, such as cylindrical cutting rollers that cut on an edge parallel to rotation, rather than at a perpendicular edge of rotation. In general, the cutting depth is defined by movement to a depth limited by a surface of the magnetic platter, as depicted at step 710 to avoid premature dismantling of the sensitive platter 50.

Following agitation, any remaining portion of the planar panel 41 detaches following severing of the fasteners, as depicted at step 711. After removal of the planar panel 41, magnetic elements may be removed from the enclosure 40, as depicted at step 712. The magnetic elements are valuable rare earth magnets used for movement of a read/write head across the rotating platter, and may be recycled.

Removal of the planar top 41 also removes an axial retainer securing the rotating platter, which is now free for removal. The enclosure is inverted for releasing the rotating platter 50 from the enclosure 40, as depicted at step 713. A fragmentation device, such as that disclosed in the copending application cited above, receives the rotating platter 50 from the enclosure 40, as shown at step 714. The declassification feature then agitates the rotating platter for severing elements of the rotating platter and reducing the severed elements within a maximum size, typically 2 mm or smaller, as depicted at step 715. It is noteworthy that only the rotating platter formerly encoded with sensitive information, rather than the entire enclosure 40, need be accommodated by the precision, declassification shredding. The fragmentation device has rotating blades and a mesh screen, such that the rotating blades fragment the rotating platter and the mesh screen defines a predetermined passage size defining a maximum size of passed fragments, as shown at step 716.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A media declassification device for a hard disk drive (HDD), comprising:
   an agitator having a plurality of cutting edges configured to dismantle rigid materials;
   a guidance element configured to direct an enclosure of the HDD against the agitator; and
   a processor configured to execute a computer program to cause the media declassification device to:
      dispose, using the guidance element, the enclosure in communication with the agitator to engage a planar portion of the enclosure to dismantle the planar portion and liberating a magnetic platter from restraint by the enclosure;

invert, using the guidance element, the enclosure to release the magnetic platter from the enclosure thereby resulting in a released magnetic platter; and dispose, using the guidance element, the released magnetic platter in communication with a fragmentation device, wherein the fragmentation device comprises rotating blades and a mesh screen, wherein the rotating blades are configured to fragment the magnetic platter, and wherein the mesh screen defines a predetermined passage size defining a maximum size of passed fragments.

2. The media declassification device of claim 1 wherein the processor is further configured to direct the enclosure relative to the agitator such that the agitator is configured to shear fragments of the enclosure to disengage the enclosure and liberate the magnetic platter from restraint by the enclosure.

3. The media declassification device of claim 1 wherein the guidance element includes a robotic member configured to secure the enclosure and dispose the enclosure to engage with the agitator.

4. The media declassification device of claim 1 wherein the agitator further comprises a rotary member having edges, wherein the edges are configured to shear fragments of the enclosure.

5. The media declassification device of claim 1 wherein the processor is further configured to identify a top of the enclosure, wherein the top of the enclosure comprises a planar panel longitudinally extending across the HDD and in a parallel adjacency with a plane in which the magnetic platter rotates.

6. The media declassification device of claim 3 wherein the processor is further configured to remove, using the agitator, at least a portion of the enclosure defined by a fastener region of a top of the enclosure and having a fastener depth.

7. The media declassification device of claim 3 wherein the guidance element further comprises a conveyor configured to transport the enclosure to proximity of the robotic member.

8. The media declassification device of claim 1 wherein the agitator is a rotating blade configured to cut to a limit defined by a plane, the plane based on a thickness of a top panel of the enclosure.

9. The media declassification device of claim 1 wherein the agitator is a fluted bit having shear edges on each of a plurality of edges around an circumferential body.

10. The media declassification device of claim 1 further comprising:

a mechanical gate configured to identify and denote the HDD as declassified using optical recognition.

11. The media declassification device of claim 1 further comprising a heating element configured to heat and remove magnetic members of a read-write head of the HDD.

* * * * *